US011016182B2

(12) United States Patent
Dunne

(10) Patent No.: US 11,016,182 B2
(45) Date of Patent: May 25, 2021

(54) THROUGH-THE-LENS, CO-ALIGNED OPTICAL AIMING SYSTEM FOR A PHASE-TYPE, LASER-BASED DISTANCE MEASURING DEVICE

(71) Applicants: Laser Technology, Inc., Centennial, CO (US); Kama-Tech (HK) Limited, Hong Kong (CN)

(72) Inventor: Jeremy G. Dunne, Parker, CO (US)

(73) Assignees: Laser Technology, Inc., Centennial, CO (US); Kama-Tech (HK) Limited, Hong Kong (CN)

( * ) Notice: Subject to any disclaimer, the term of this patent is extended or adjusted under 35 U.S.C. 154(b) by 238 days.

(21) Appl. No.: 15/723,387

(22) Filed: Oct. 3, 2017

(65) Prior Publication Data

US 2018/0095164 A1 Apr. 5, 2018

Related U.S. Application Data

(60) Provisional application No. 62/403,990, filed on Oct. 4, 2016.

(51) Int. Cl.
| | |
|---|---|
| *G01S 7/484* | (2006.01) |
| *G01S 17/10* | (2020.01) |
| *G01S 7/51* | (2006.01) |
| *G01S 17/36* | (2006.01) |
| *G01S 17/26* | (2020.01) |
| *G01S 17/87* | (2020.01) |

(52) U.S. Cl.
CPC .............. *G01S 7/484* (2013.01); *G01S 7/51* (2013.01); *G01S 17/10* (2013.01); *G01S 17/26* (2020.01); *G01S 17/36* (2013.01); *G01S 17/87* (2013.01)

(58) Field of Classification Search
CPC .......... G01S 7/484; G01S 17/102; G01S 7/51; G01S 17/36; G01S 17/10; G01S 17/87; G01S 17/26
USPC ....................................................... 356/5.01
See application file for complete search history.

(56) References Cited

U.S. PATENT DOCUMENTS

| | | | | |
|---|---|---|---|---|
| 6,124,920 | A * | 9/2000 | Moseley | ............ G02B 27/2214 349/201 |
| 8,902,409 | B2 * | 12/2014 | Sigmund | ................. G01S 7/487 356/5.01 |
| 8,988,648 | B2 * | 3/2015 | Trissei | ................... G02F 1/1335 349/11 |
| 9,367,145 | B2 * | 6/2016 | Sheynblat | ............. G06F 1/1626 |
| 9,817,549 | B2 * | 11/2017 | Chandrasekaran | ... G06F 3/0482 |
| 2002/0093639 | A1 | 7/2002 | Haga | |
| 2011/0279808 | A1 | 11/2011 | Dunne | |

(Continued)

FOREIGN PATENT DOCUMENTS

| | | |
|---|---|---|
| CN | 202149769 U | 2/2012 |
| CN | 103760566 A | 4/2014 |

OTHER PUBLICATIONS

Extended European Search Report dated Mar. 6, 2018 issued in corresponding EP Application No. 17194724.5-1206.

(Continued)

*Primary Examiner* — Daniel L Murphy
(74) *Attorney, Agent, or Firm* — William J. Kubida; Hogan Lovells US LLP

(57) ABSTRACT

A through-the-lens, co-aligned aiming system for a phase-type, laser-based distance measuring device incorporating a co-aligned aiming system with an in-scope, view through LCD display.

12 Claims, 12 Drawing Sheets

(56) References Cited

U.S. PATENT DOCUMENTS

| | | |
|---|---|---|
| 2012/0109577 A1 | 5/2012 | Nyhart |
| 2014/0071424 A1 | 3/2014 | Dunne |
| 2014/0071426 A1 | 3/2014 | Dunne |
| 2015/0369565 A1 | 12/2015 | Kepler |

OTHER PUBLICATIONS

European Patent Office Examination Report dated Mar. 26, 2020, corresponding the EP Application No. 17 194 724.5-1206.

* cited by examiner

118

200

| External Main Display 118 | HUD Display 200 | Description | Meaning |
|---|---|---|---|
| — — ·, — — — | 8888 | Main Display | Displays messages and measurement results. |
| ° | ° | Degrees | Inclination measurement units. |
| ▪︎╲╱▪︎ | △% | Percent Slope | |
| F | F | Feet | Distance measurement units. Selection available in the System Setup Mode. |
| M | M | Meters | |
| ▭ | ▭ | Battery Status | In the main display indicates battery power |
| N/A | ✛ | Crosshair | Serves as the aiming point reference, both horizontally and vertically. |
| ※ ▯ | ▴※ ▯ | Laser Status | *Visible and Flashing:* Laser is firing. *Visible and Steady:* Target is acquired. *Not Visible:* Laser is not active. |
| ▯↑ | ▯ | Measurement Reference | The measuring point of the Device 100 |
| ◿ | △ | Inclination Measurement Mode (INC) | The angle of inclination between the Device 100 and the target. |

*Fig. 6A*

| | | | |
|---|---|---|---|
|  | 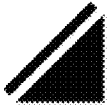 | Slope Distance Measurement Mode (SD) | Straight line distance between the Device 100 and the target. |
|  | 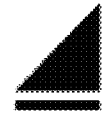 | Horizontal Distance Measurement Mode (HD) | Slope-corrected distance between the Device 100 and the target, projected in the horizontal (XY) plane; a.k.a. Run. |
|  |  | Vertical Distance Measurement Mode (VD) | Slope-corrected distance between the Device 100 and the target, projected in the vertical (Z) plane; a.k.a. Rise. |
|  | 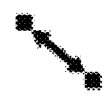 | Missing Line Measurement Routine (ML) | Two-step Missing Line Routine finds the connecting vector (or missing line) between two points. |
|  |  | Height Measurement Routine (HT) | Three-step height routine. The final calculation represents the vertical distance between the points on the target represented by ANG1 and ANG2. |
|  |  | Closest Target Mode | The unit logs multiple targets while  is held down. The XX denotes that additional targets have been acquired. Of the targets acquired, the distance to the closest target displays. |
|  |  | Farthest Target Mode | The unit logs multiple targets while  is held down. The XX denotes that additional targets have been acquired. Of the targets acquired, the distance to the farthest target displays. |
|  |  | Filter Mode | Similar to Standard, single shot mode, but the laser's sensitivity is reduced so it only detects pulses returned from a reflector. The optional foliage filter is used in conjunction with this mode. |

*Fig. 6B*

| | | | |
|---|---|---|---|
| | ↻ | Continuous Mode | |
| 🕒 | N/A | Timer | |
| ▭ | ☐ | Area | |
| ▱ | ▱ | Volume | |
| +/− | =<br>+ | ADDITION / SUBTRATION / EQUAL | |
| min/max | | MIN/MAX | |
| 1,2,3 | ▤ | DATA RECALL | |
| ← | N/A | BACK | |
| ✕ | N/A | EXIT | |
| | ▽HA | Although the Device 100 may not use these indicators, they may optionally appear during the Display Indicator Test. | |
| N/A | N̂ | Although the Device 100 may not use these indicators, they may optionally appear during the Display Indicator Test. | |

*Fig. 6C*

THROUGH-THE-LENS, CO-ALIGNED OPTICAL AIMING SYSTEM FOR A PHASE-TYPE, LASER-BASED DISTANCE MEASURING DEVICE

CROSS REFERENCE TO RELATED PATENT APPLICATIONS

The present invention is related to, and claims priority from, U.S. Provisional Patent Application Ser. No. 62/403,990 filed Oct. 4, 2016, the disclosure of which is herein specifically incorporated by this reference in its entirety.

The present invention is further related to the technology disclosed in U.S. Pat. No. 9,354,051 issuing May 21, 2016 for: "System and Method for a Rangefinding Instrument Incorporating Pulse and Continuous Wave Signal Generating and Processing Techniques for Increased Distance Measurement Accuracy"; and U.S. Pat. No. 9,213,101 issuing Dec. 15, 2015 for: "Self-Aligned Aiming System and technique for a Laser Rangefinder Incorporating a Retroreflector". The present invention is also related to the technology disclosed in United States Patent Application Publication Ser. No. 2014/0071425 filed Sep. 13, 2012 for: "System and Method For Superimposing a Virtual Aiming Mechanism with a Projected System Beam in a Compact Laser-Based Rangefinding Instrument" and U.S. patent application Ser. No. 15/249,163 filed Aug. 26, 2016 for: "Backlighting Technique for Liquid Crystal and Other Displays in Electronic Instruments". The foregoing patents and patent applications are assigned to the assignee of the present application and the disclosures thereof are hereby incorporated by this reference in their entirety as if fully set out herein.

BACKGROUND OF THE INVENTION

The present invention relates, in general, to the field of aiming systems for electronic distance measuring devices. More particularly, the present invention relates to a through-the-lens, co-aligned aiming system for a phase-type, laser-based distance measuring device.

Currently available laser distance meters include the Disto™ 5910 available from Leica Geosystems, Inc. Such devices and those of other manufacturers utilize a visible aiming pointer, a reflex sight or aiming camera to identify a target for distance measurement purposes. The through-the-lens, co-aligned aiming system for a phase-type, laser-based distance measuring device of the present invention provides a greatly improved sighting and aiming system over such conventional devices.

SUMMARY OF THE INVENTION

Disclosed herein is a through-the-lens, co-aligned aiming system for a phase-type, laser-based distance measuring device such as a laser distance meter. The representative embodiment disclosed comprises a laser range sensor, integrated tilt sensor and a digital processor. As disclosed herein, the device comprises nine user actuatable buttons that access the unit's internal software which controls the integrated sensors.

The laser range sensor emits eye-safe pulses of energy and determines distance by measuring the time it takes for each pulse to travel from the rangefinder to the target and then back. An indicator is displayed whenever the laser pulses are being transmitted. The device disclosed herein exhibits a broad spectrum of sensitivity and can function with both reflective and non-reflective targets.

Among the features provided are a bright red Light Emitting Diode (LED) display which dramatically improves visibility in all lighting conditions including outdoors in bright sunlight. The laser sensor is operative in conjunction with an integrated tilt sensor function to enable measurement of slope distance and inclination with values being automatically calculated for horizontal distance, vertical distance, height and two-dimensional (2D) missing line measurement. A targeting mode allows a user to select or eliminate targets which enables the most accurate measurement possible in a variety of field conditions.

Among the device operating modes are: a) Targeting Menu including range gate, closest target, farthest target, filter, continuous and timer modes; b) Settings Menu including Bluetooth, vibrate, tilt alignment, pointer, data recall and systems; c) Systems Menu including information, factory reset, firmware upgrade and favorites; d) Functions Menu including height, missing line, area, add/subtract, minimum/maximum, volume; e) Units of Measurement Menu including feet/inches, meters/centimeters, yards, percent slope/degrees; f) Measurement Modes including horizontal, slope, inclination and vertical.

Particularly disclosed herein is a laser-based distance measuring device which comprises a phase-based laser transmitting and receiving module; an optical aiming system for directing pulses of laser energy produced by said laser transmitting and receiving module toward a target; a view-through display superimposed on said optical aiming system; and a processor coupled to said laser transmitting and receiving module and said display for providing an indication of a distance between said device and said target.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein:

FIGS. 6A, 6B, and 6C depict visual indications that may display on one or both of the external main display and the HUD display.

DESCRIPTION OF A REPRESENTATIVE EMBODIMENT

Figure 1A:
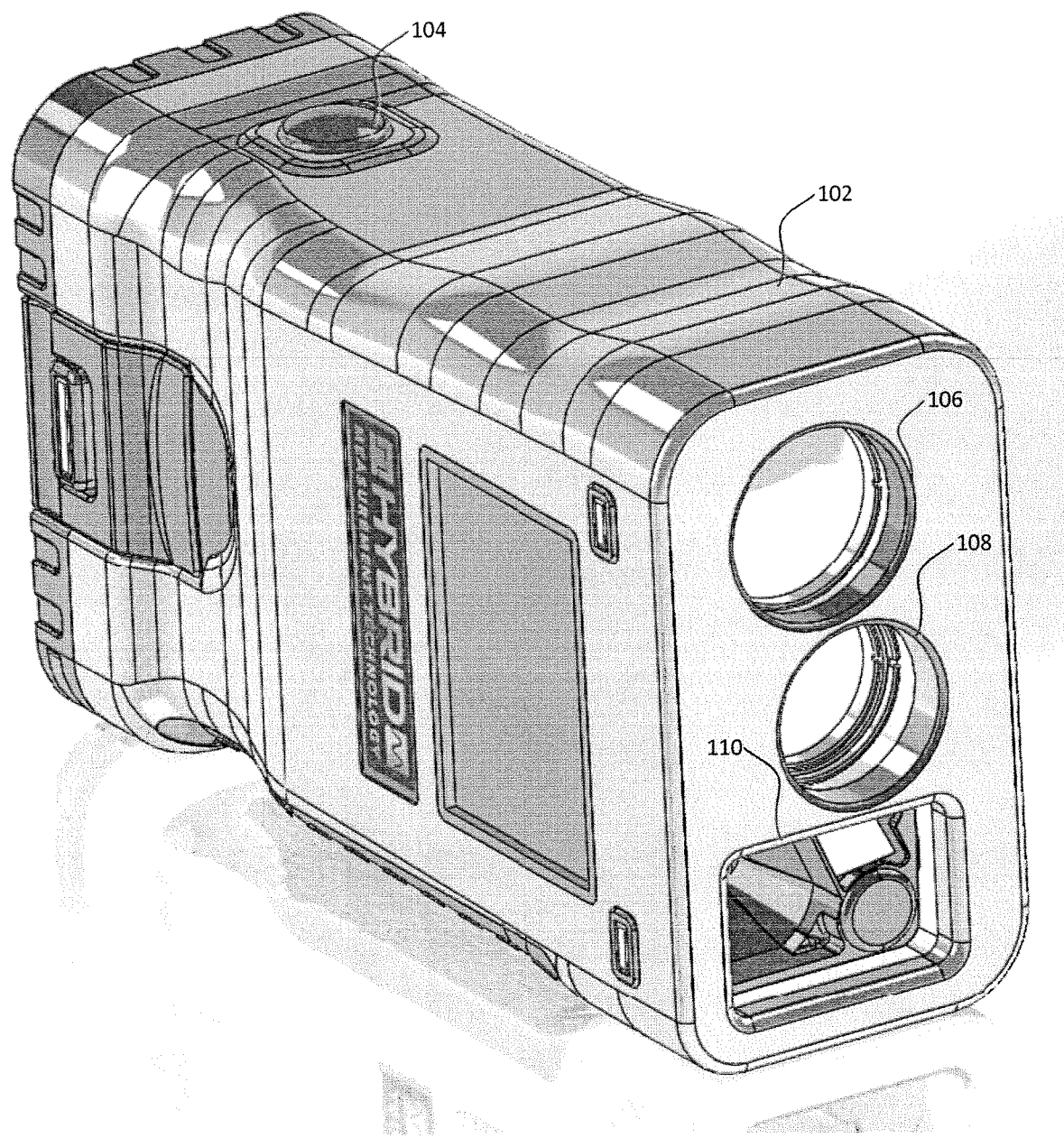
FIGS. 1A, 1B and 1C are respectively left front, left rear and right rear isometric views of a representative embodiment of the phase-type, laser-based distance measuring device of the present invention illustrating the external housing and controls.
Figure 1B:
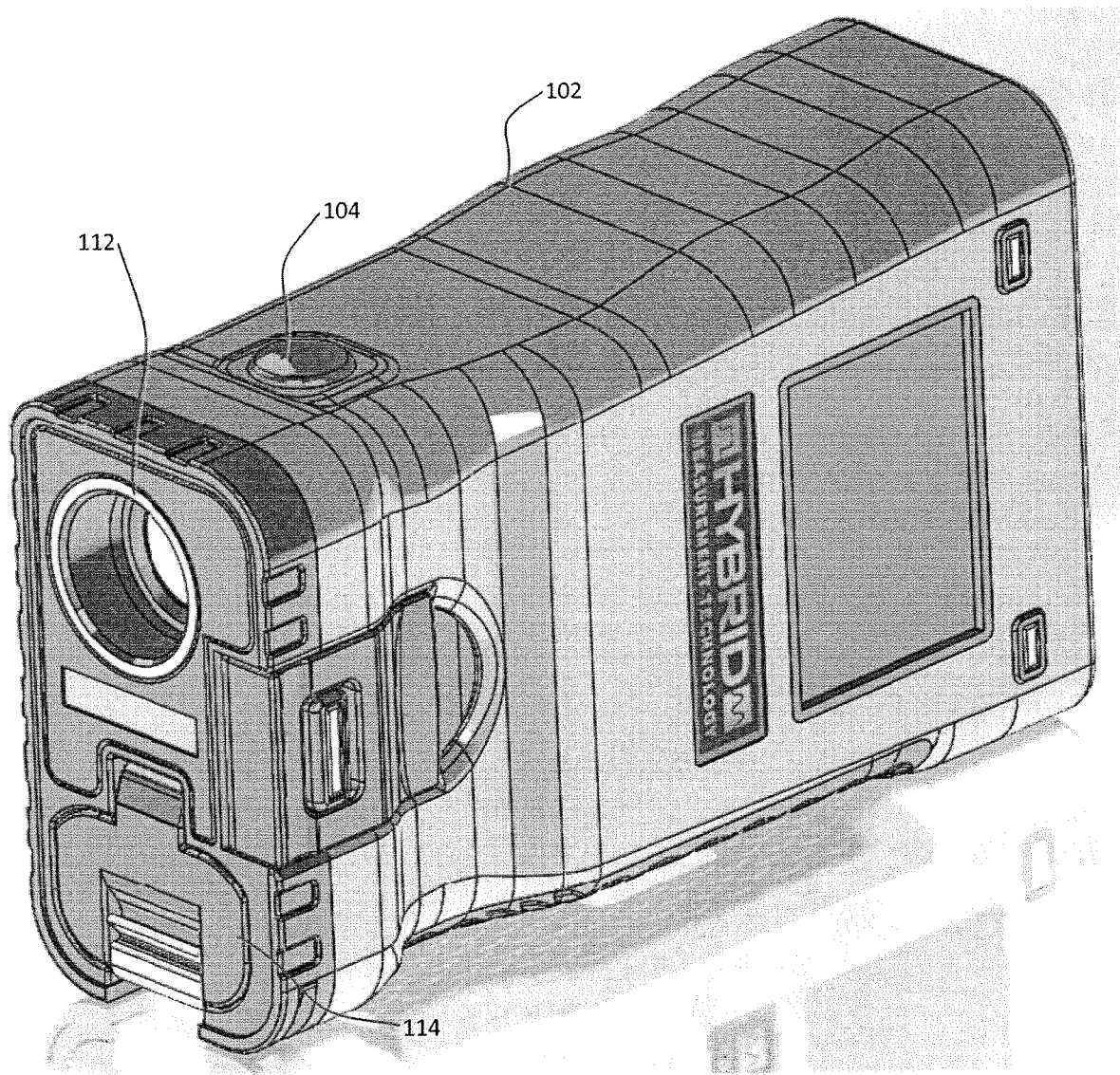
Figure 1C:
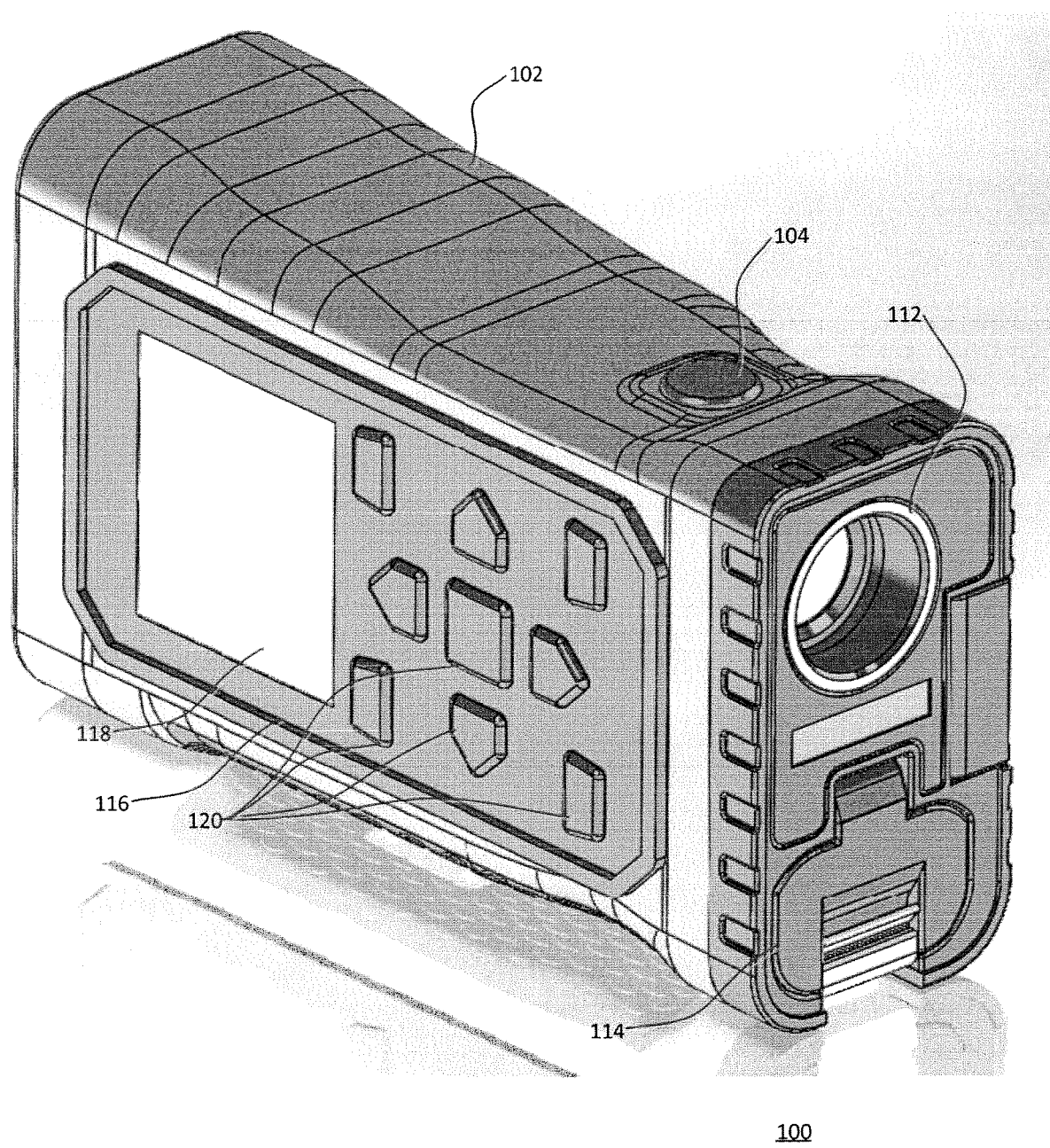

With reference now to FIGS. 1A, 1B and 1C, shown are respectively left front, left rear and right rear isometric views of a representative embodiment of the phase-type, laser-based distance measuring device 100 of the present invention illustrating the external housing and user actuatable controls. The representative embodiment of the device 100 illustrated also includes a pulse laser system as well.

The device 100 comprises an external hand-holdable housing 102 with a fire button 104 mounted on the top portion. Also illustrated in this representative embodiment, a pulsed-laser return signal receive aperture 106, a pulsed-laser signal transmit aperture 108 and a phase-type, laser-based signal transmission and receiving aperture 110.

With particular reference to FIGS. 1B and 10, the device 100 also includes an ocular viewport 112 and battery insertion door 114. The device 100 further incorporates an external main display 118 and user-actuatable button controls 120 located within a recessed portion 116 of the housing 102.

Figure 2A:
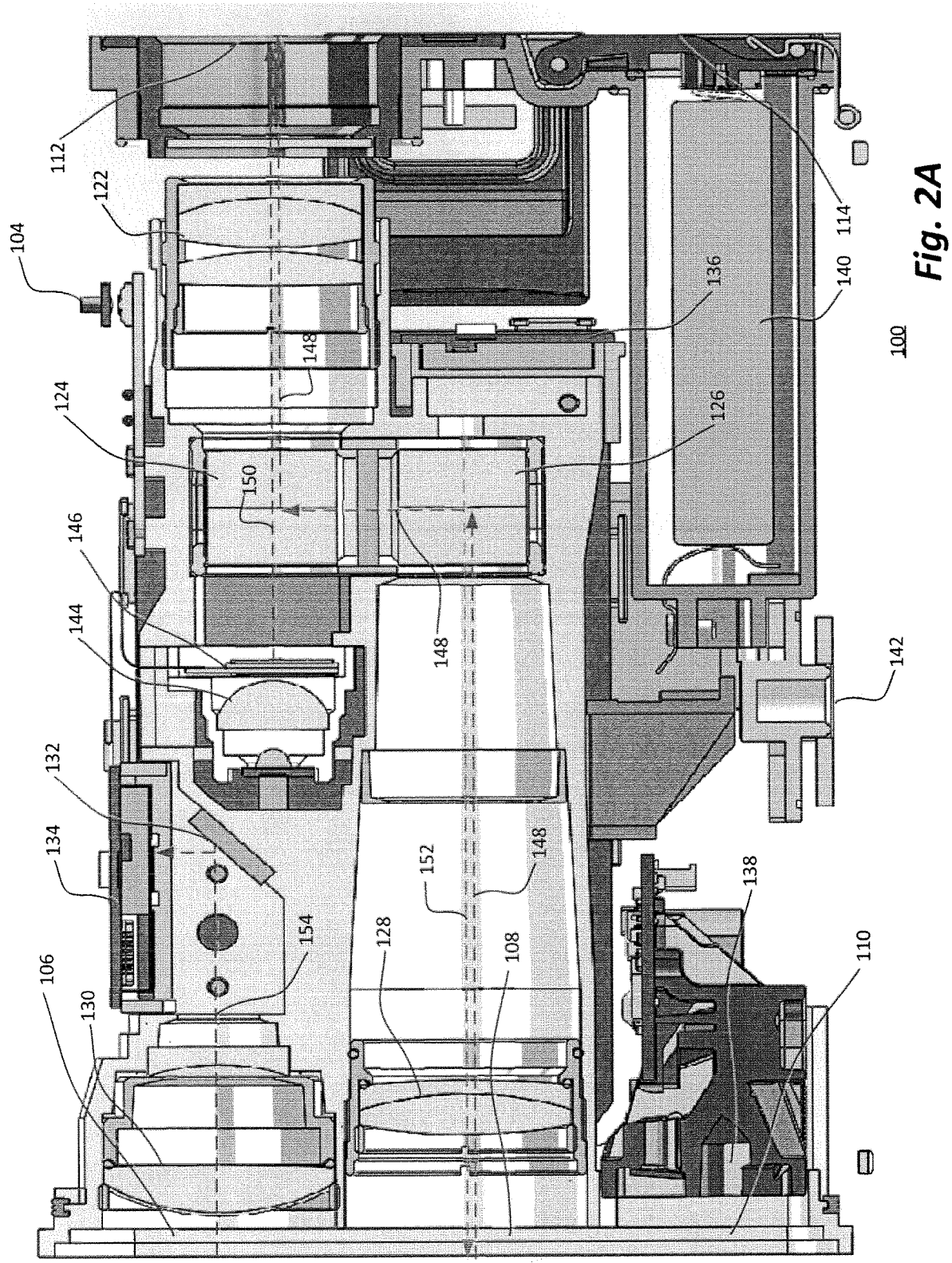
FIGS. 2A, 2B and 2C are respectively a right side cross-section elevational, right front cross-sectional isometric and right rear cross-sectional isometric views of the representative embodiment of FIGS. 1A-1C illustrating the internal structure of the device.
Figure 2B:
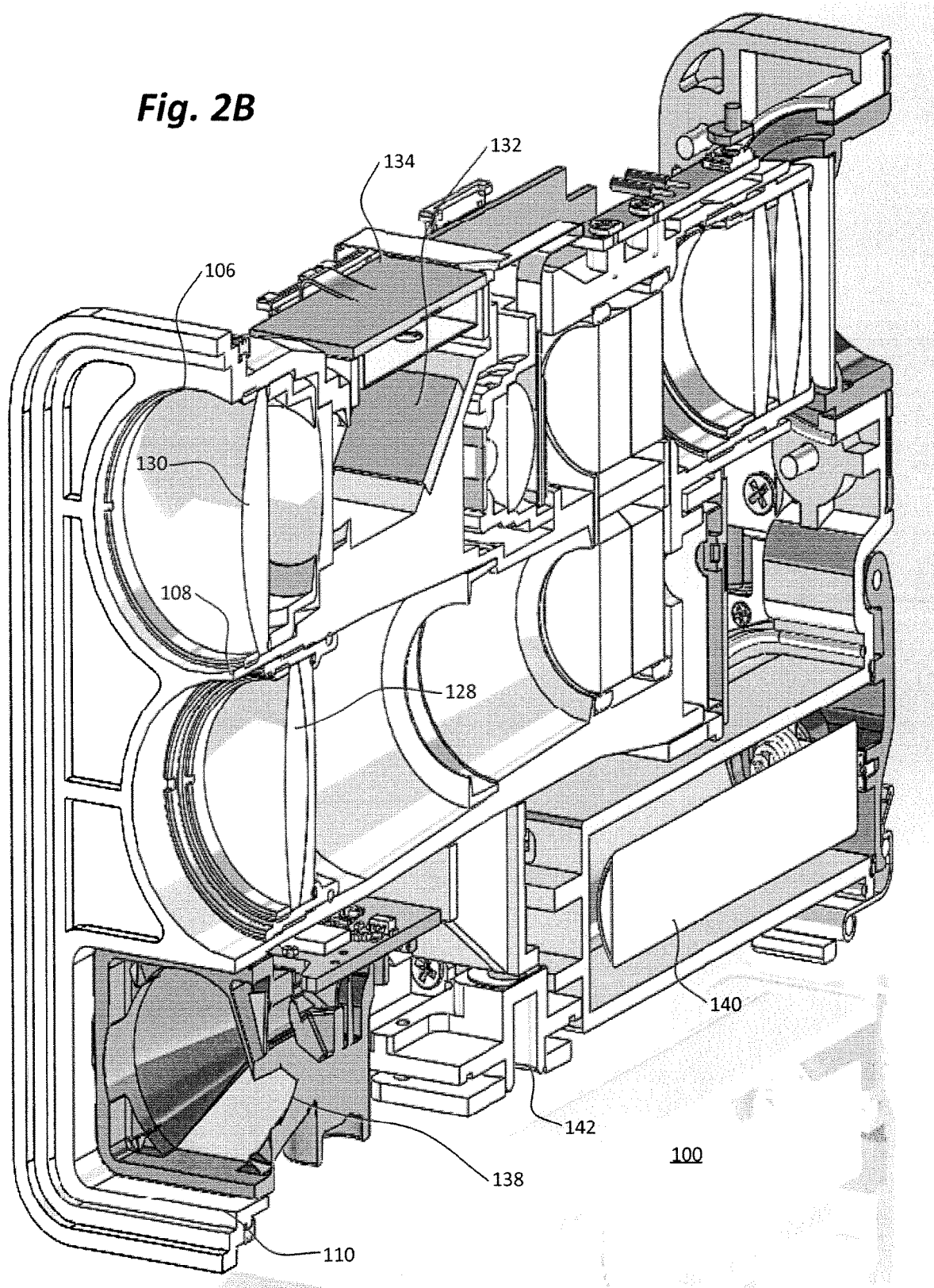
Figure 2C:
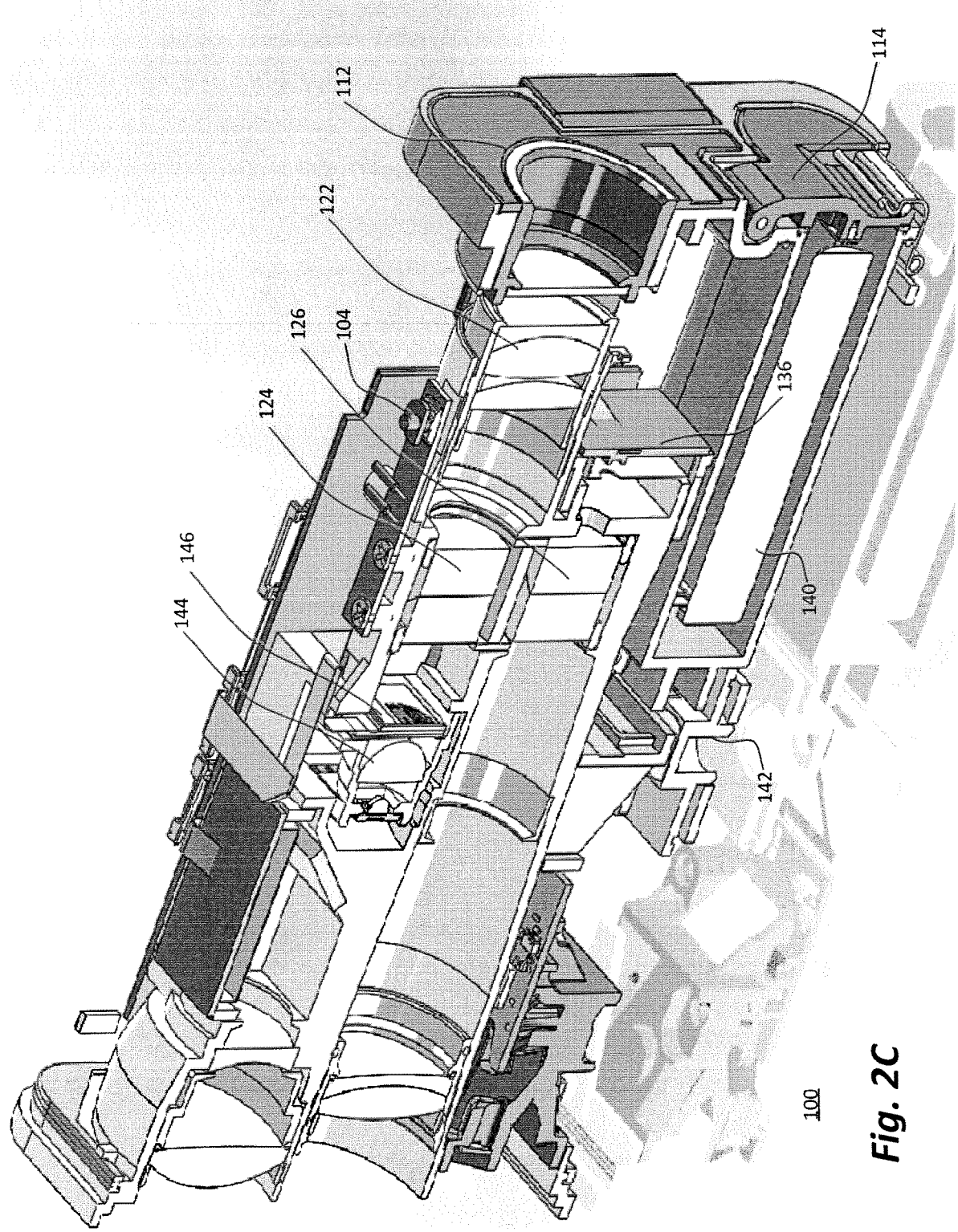

With reference additionally now to FIGS. 2A, 2B and 2C, shown are respectively a right side cross-section elevational, right front cross-sectional isometric and right rear cross-sectional isometric views of the representative embodiment of FIGS. 1A-1C illustrating the internal structure of the device 100. With respect to these figures, like structure to that previously described with respect to the foregoing figures is like numbered and the foregoing description thereof shall suffice herefor.

The device 100 includes an ocular lens grouping 122 adjacent the ocular viewport 112 through which a target and the co-aligned aiming system of the HUD can be viewed. A pair of prisms 124 and 126 and an objective lens 128 direct a view of the target through the ocular lens grouping 122 to a user through the ocular viewport 112 along visual path 148 as shown.

In the representative embodiment of the device 100 a receiving lens 130 adjoining the return signal receive aperture 106 directs reflected pulsed-laser energy to a mirror 132 for redirection to a laser receive (RX) board 134 along path 154. The representative embodiment of the device 100 further incorporates a pulsed-laser transmit (TX) board 136 which transmits pulsed-laser energy along path 152 as shown. A phase-type, laser-based distance measuring module 138 transmits and receives phase-based laser energy to a target through the transmission and receiving aperture 110 as well as projecting a visible aiming beam to the target that can be observed through the ocular viewport 112 in conjunction with the HUD display.

The device 100 further incorporates a light emitting diode (LED) backlighting source in conjunction with a backlight lens 144 for providing illumination to a black mask liquid crystal display (BMLCD) 146. Information displayed on the backlit BMLCD 146 is visible in the ocular viewport 112 along path 150 in conjunction with a view of the target along visual path 148. In a portable, or handheld embodiment of the device 100, power may be supplied by an on-board battery 140. The device 100 may also incorporate a tripod mounting point 142 as shown for operation in other than a handheld mode.

In the representative embodiment of the present invention, the LED, backlight lens 144 and BMLCD 146 may conveniently be provided in accordance with the disclosure of U.S. patent application Ser. No. 15/249,163 filed Aug. 26, 2016 for: "Backlighting Technique for Liquid Crystal and Other Displays in Electronic Instruments".

Figure 3A:
FIG. 3A is a detailed illustration of a representative embodiment of the external main display as indicated in FIG. 1C.

With reference additionally now to FIG. 3A, shown is a detailed illustration of a representative embodiment of the external main display 118 as indicated in FIG. 1C.

Figure 3B:
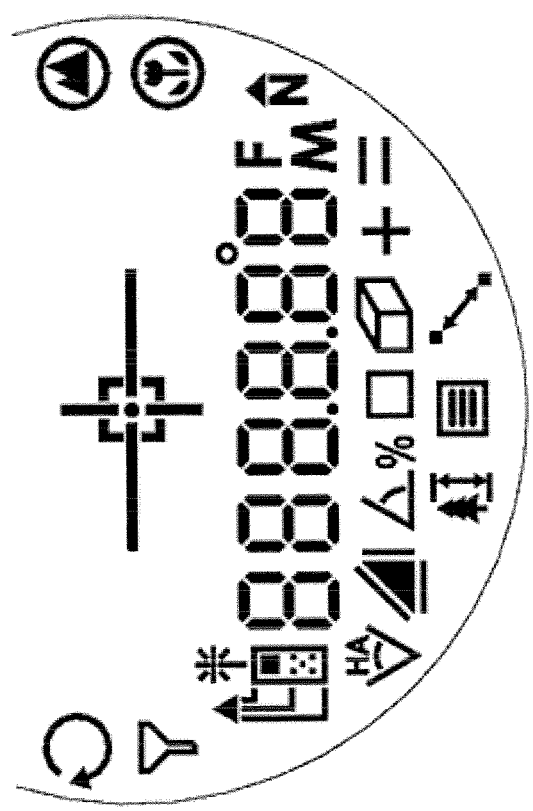
FIG. 3B is a detailed illustration of a representative embodiment of the through-the-lens, co-aligned aiming system forming a portion of the device heads-up-display (HUD)

With reference additionally now to FIG. 3B, shown is a detailed illustration of a representative embodiment of the through-the-lens, co-aligned aiming system forming a portion of the device heads-up-display (HUD) 200.

Visual indications on one or both of the external main display 118 and the HUD display 200 are shown in the tables depicted in FIGS. 6A-6C.

Figure 4B:
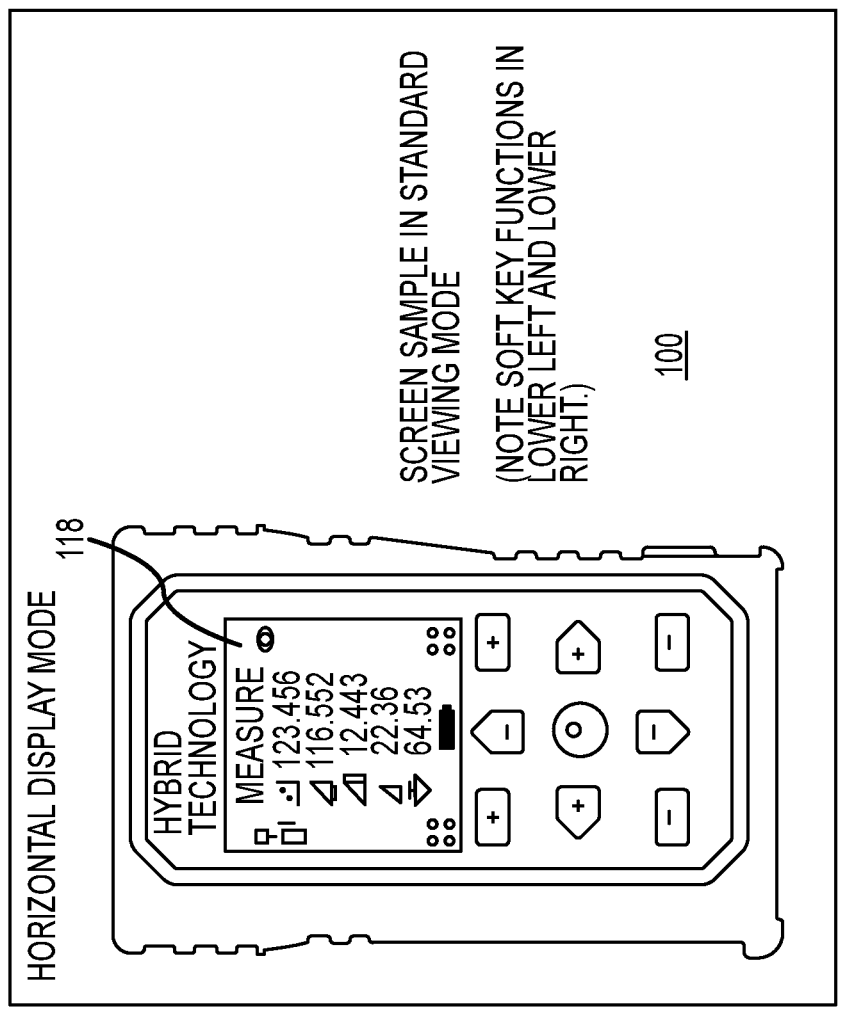
FIGS. 4A and 4B respectively illustrate the device in a horizontal configuration and the concomitant orientation of sample information on the external main display.
Figure 4A:
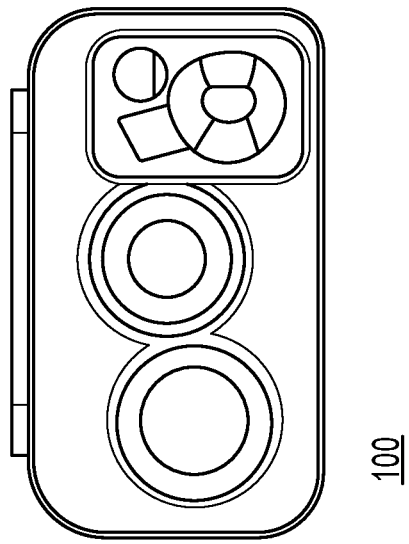

With reference additionally now to FIGS. 4A and 4B the device 100 is illustrated in a horizontal configuration (FIG. 4A) together with the concomitant orientation of sample information on the external main display 118 (Fig. B).

Figure 5B:
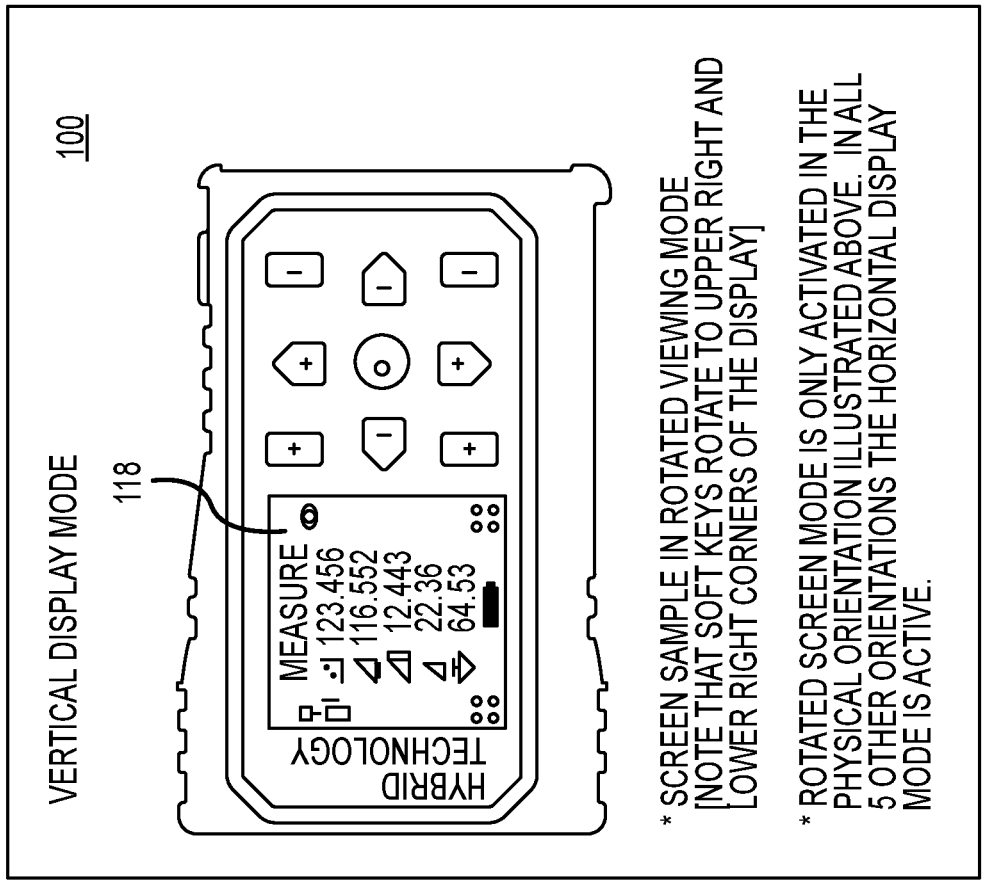
FIGS. 5A and 5B respectively illustrate the device in a vertical configuration and the concomitant orientation of sample information on the external main display.
Figure 5A:
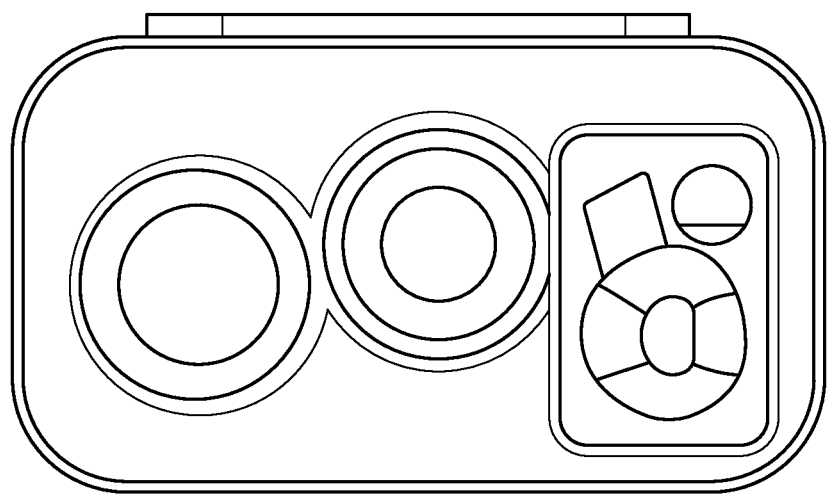

With reference additionally now to FIGS. 5A and 5B the device 100 is illustrated in a vertical configuration (FIG. 5A) together with the concomitant orientation of sample information on the external main display 118 (FIG. 5B).

In the representative embodiment of the device 100 the display of information on either or both of the external main display 118 or the HUD 200 (by means of the BMLCD 146) may be handled such that when the device 100 is in a horizontal configuration (i.e. as in FIGS. 4A and 4B) the HUD 200 is not powered on. Alternatively, when the device is in a vertical configuration (i.e. FIGS. 5A and 5B) the HUD 200 is powered on and the information on the external main display 118 is rotated by 90 degrees. For purposes of minimizing power dissipation and battery 140 current drain, the HUD 200 may be desirably enabled only in those situations when the device 100 is operated in a vertical configuration.

It should be noted that, although in the representative embodiment of the invention disclosed above a device 100 has been shown having both phase-based and pulse-based laser systems, the principles of the present invention are more generally applicable to a phase-type, laser distance meter device incorporating a co-aligned aiming system with an in-scope, view through LCD display in the form of a simple monocular device.

While there have been described above the principles of the present invention in conjunction with specific apparatus and structure, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

As used herein, the terms "comprises", "comprising", or any other variation thereof, are intended to cover a nonexclusive inclusion, such that a process, method, article, or apparatus that comprises a recitation of certain elements does not necessarily include only those elements but may include other elements not expressly recited or inherent to such process, method, article or apparatus. None of the description in the present application should be read as implying that any particular element, step, or function is an essential element which must be included in the claim scope and THE SCOPE OF THE PATENTED SUBJECT MATTER IS DEFINED ONLY BY THE CLAIMS AS ALLOWED. Moreover, none of the appended claims are intended to invoke paragraph six of 35 U.S.C. Sect. 112 unless the exact phrase "means for" is employed and is followed by a participle.

What is claimed is:

1. A laser-based distance measuring device comprising:
   a phase-based laser transmitting and receiving module;
   an optical aiming system for directing pulses of laser energy produced by said laser transmitting and receiving module toward a target;
   a view-through display superimposed on said optical aiming system; and
   a processor coupled to said laser transmitting and receiving module and said display for providing an indication of a distance between said device and said target.

2. The laser-based distance measuring device of claim 1 wherein said phase-based laser transmitting and receiving module is operative to project a visible beam from said device to said target.

3. The laser-based distance measuring device of claim 1 wherein said optical aiming system comprises:
   an ocular lens system;
   first and second prisms; and
   an objective lens.

4. The laser-based distance measuring device of claim 1 wherein said view-through display comprises a backlit, liquid crystal display.

5. The laser-based distance measuring device of claim 4 wherein said liquid crystal display comprises a black mask liquid crystal display.

6. The laser-based distance measuring device of claim 1 further comprising:
   an external display coupled to said processor viewable on an external housing of said device.

7. The laser-based distance measuring device of claim 6 wherein said external display provides information in a first orientation when said device is displaced horizontally and in a second, rotated orientation when said device is displaced vertically.

8. The laser-based distance measuring device of claim 7 wherein said view-through display is not operational when said device is displaced horizontally.

9. The laser-based distance measuring device of claim 7 wherein said view-through display is operational when said device is displaced vertically.

10. The laser-based distance measuring device of claim 6 wherein said housing is a handheld housing.

11. The laser-based distance measuring device of claim 6 wherein said housing is adapted for tripod mounting.

12. The laser-based distance measuring device of claim 1 further comprising:
   a pulse-based laser transmitter aligned with said optical aiming system for directing laser energy toward said target; and
   a pulse-based laser receiver for receiving reflected laser energy from said target, said pulse-based laser transmitter and receiver being coupled to said processor.

* * * * *